United States Patent
Almadani et al.

(10) Patent No.: US 12,445,191 B2
(45) Date of Patent: *Oct. 14, 2025

(54) MULTIPLE LAYER MULTIPLE ALTITUDE NETWORK SYSTEM

(71) Applicant: KING FAHD UNIVERSITY OF PETROLEUM AND MINERALS, Dhahran (SA)

(72) Inventors: Basem Almadani, Dhahran (SA); Abdurrahman Beg, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/209,465

(22) Filed: May 15, 2025

(65) Prior Publication Data
US 2025/0274190 A1      Aug. 28, 2025

Related U.S. Application Data

(63) Continuation of application No. 18/085,959, filed on Dec. 21, 2022, now Pat. No. 12,308,938.

(51) Int. Cl.
*H04B 7/185* (2006.01)
*H04L 45/745* (2022.01)

(52) U.S. Cl.
CPC ....... *H04B 7/18504* (2013.01); *H04L 45/745* (2013.01)

(58) Field of Classification Search
CPC .. H04B 1/0458; H04B 1/3838; H04B 7/0608; H04B 7/0802; H04B 7/0814; H04W 52/02; H01Q 1/243; H01Q 21/28
See application file for complete search history.

(56) References Cited

U.S. PATENT DOCUMENTS

10,470,243 B2 * 11/2019 Sundaresan ......... H04W 64/003
2016/0381596 A1 * 12/2016 Hu .................... H04W 28/0268
                                                                    370/236

(Continued)

FOREIGN PATENT DOCUMENTS

| CN | 110149671 A | 8/2019 |
|---|---|---|
| CN | 109547345 B | 11/2020 |
| WO | WO 2022/182120 A1 | 9/2022 |

OTHER PUBLICATIONS

Sahingoz ; Mobile networking with UAVs: Opportunities and challenges ; IEEE Xplore ; Jul. 22, 2013 ; Abstract Only ; 3 Pages.

*Primary Examiner* — Khalid W Shaheed
(74) *Attorney, Agent, or Firm* — Oblon, McClelland, Maier &Neustadt, L.L.P.

(57) ABSTRACT

A system and methods relate to an aerial access network (AAN). The system comprises multiple control layer units, multiple forwarding layer units, and multiple access layer units. A first control layer unit in the multiple control layer units is configured to administrate the multiple forwarding layer units and the multiple access layer units and perform first data transmissions between the multiple forwarding layer units and a ground base station. A first forwarding layer unit is configured to be associated with at least one access layer unit and perform second data transmissions between the at least one access layer unit and one of the first control layer unit or the ground base station. A first access layer unit is configured to be associated with at least one user equipment (UE) and perform third data transmissions between the first forwarding layer unit and the at least one UE.

18 Claims, 8 Drawing Sheets

(56) References Cited

U.S. PATENT DOCUMENTS

| | | |
|---|---|---|
| 2018/0035306 A1 | 2/2018 | Zavesky et al. |
| 2018/0284758 A1* | 10/2018 | Cella .................. G05B 23/0264 |
| 2019/0324444 A1* | 10/2019 | Cella .................... G06N 3/088 |
| 2020/0133257 A1* | 4/2020 | Cella .................. G05B 19/4183 |
| 2022/0103246 A1* | 3/2022 | Chai .................. H04B 7/18504 |
| 2023/0029907 A1 | 2/2023 | Jassal |

* cited by examiner

MULTIPLE LAYER MULTIPLE ALTITUDE NETWORK SYSTEM

CROSS-REFERENCE TO RELATED APPLICATIONS

The present application is a Continuation of U.S. application Ser. No. 18/085,959, now allowed, having a filing date of Dec. 21, 2022.

BACKGROUND

Technical Field

The present disclosure is directed to cellular communication. In particular, the present disclosure relates to a system and method for providing a network service using an Aerial Access Network (AAN).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Next-generation cellular networks, such as 5G or 6G, are facing challenges in providing high-bandwidth capacity, reliability, and availability of networks owing to the ever-increasing number of network-capable devices. Network-capable devices, such as smartphones, tablets, Internet-of-Things (IoT) devices, enterprising networks of computing devices, and the like, are creating ever-growing requirements for a stable and reliable network. Moreover, an Unmanned Aerial Vehicle (UAVs) connected to a cellular network and sharing wireless radio spectrum bands creates additional challenges of integration. Mitigating challenges, such as restrictions on the expansion of infrastructure needed to serve an increasing number of devices requiring the network connectivity and an increasing demand for stable and reliable network connectivity, new-generation cellular networks are implementing state-of-the-art techniques, for example, higher frequency bands, such as millimeter waves (MMwaves), device-to-device (D2D) communication, ultra-dense small cell network, and moving networks. These techniques mitigate the challenges to some extent but invite further challenges, such as complex implementation. For example, ultra-dense small cell networks require resolving issues of interference and link management. MMWave communication is limited by its reliance on line-of-sight (LoS) for maximum capacity due to the high frequency of the signal. D2D communication requires better optimization of frequency bands and energy resource management. Moving networks need to provide reliable network connectivity while efficiently managing mobility with low energy consumption and at the low resource cost of ground user terminals.

In light of the current challenges, "connectivity from the sky" is a promising solution. Satellites, high and low altitude platforms (HAP and LAP), drones, aircraft, and airships have been employed as flying base stations or gateways to order to increase the coverage and the capacity of networks for wireless communications by complementing the terrestrial communication infrastructure. Combining these network elements, an aerial access network (AAN) can be formed. AANs are subject to heterogeneous networks characterized by frequently changing network topologies and more vulnerable communication connections, as compared to terrestrial wireless networks. However, AANs can provide data services in underserved and unserved areas that cannot be covered by terrestrial cellular networks and can reinforce 5G service reliability by providing service continuity for machine to machine (M2M), Internet of Things (IoT) devices, and on-board moving platforms.

UAVs have been employed as mobile aerial base stations or relays mounting communication transceivers to establish enhanced access provided for ground users to communication services in overloaded networks or during emergencies. These UAVs are dynamically deployed aerial service provider units that complement 5G ground base stations. The aerial units have a higher probability to maintain the LoS links with ground user equipment (UEs) as they have the capability to dynamically adjust altitude and location. In overloading situations, swarms of UAV units can be deployed to provide scalable and ubiquitous connectivity to UEs.

Traditional cellular network models and protocols have limited capability for serving in highly mobile, dynamic environments, specifically when moving devices are deployed in the network. For example, for the deployment of the UAV device by a UAV service provider over a disaster-stricken area for a temporary period, the UAV devices may require seamless integration with the existing cellular network infrastructure. Once the task assigned to the UAV is completed, the service needs to be disintegrated without disrupting the network. Current cellular network models do not adequately support the flexibility required for this on-demand configuration and management. In addition, modern network models are unable to adapt to real-time changes to the environment of UEs, for example, serving a dense group of UEs in motion.

The aforementioned limitations may be mitigated by the implementation of flexible networks that are capable of dynamically adapting to changing environments. For example, software-defined networking (SDN), cloud computing, and network function virtualization (NFV) may be enabled to perform on-demand configuration and network management.

The SDN paradigm decouples the control plane from the data plane in a network, enabling the programmability of the network. The centralized management and control of network devices in SDN simplifies the complexities of dynamic node behavior in AAN. The control plane masks administrative duties of the network from data plane entities, for example, optimization of routes from endpoint to endpoint. The data plane entity is tasked with forwarding data from point-to-point.

U.S. Pat. No. 10,470,243B2A, incorporated herein by reference in its entirety, describes a wireless communication system consisting of a plurality of UAVs that forms a wireless multi-hop mesh network constituting a backhaul comprises three primary agents at each UAV device, a radio access network (RAN) agent, a haul agent, and a core agent. The system does not consider the limitations of 5G radio transmitters in mmWave bands, and also, does not implement a multi-tier approach for scalability.

The conventional solutions suffer from one or more drawbacks hindering their adoption. Conventional techniques lack concrete solutions for an on-demand configuration, the management of aerial nodes, interference, and mobility. Further, systems that are proven effective for high-altitude airborne platforms above static locations, face challenges of weather variations at these altitudes causing interference. Overall, the existing technologies lack effective management of mobility for dynamic changing environments.

Accordingly, it is one object of the present disclosure to provide methods and systems for a dynamic network infrastructure deployment for next-generation cellular networks that address the challenges of service capability, dynamically changing environments, scalable architecture employing multi-tier infrastructure, prevention of network degradation due to damaged macro-base stations (MBS) from natural disasters or malicious attacks, increased latency between network packets and interrupted coverage.

SUMMARY

In an exemplary embodiment, an aerial access network (AAN) system is disclosed. The system mainly comprises multiple control layer units, multiple forwarding layer units, and multiple access layer units. In one implementation, a first control layer unit of the multiple control layer units is configured to manage a subset of the multiple forwarding layer units and a subset of the multiple access layer units; and perform the first data transmissions between the managed subset of the multiple forwarding layer units and a ground base station. In one implementation, a first forwarding layer unit in the managed subset of the multiple forwarding layer units is configured to be associated with at least one access layer unit in the managed subset of the multiple access layer units; and perform second data transmissions between the at least one access layer unit and one of the first control layer unit or the ground base station. In one implementation, a first access layer unit in the at least one access layer unit is configured to be associated with at least one user equipment (UE); and perform third data transmissions between the first forwarding layer unit and the at least one UE.

In another exemplary embodiment, a method of providing a network service using an aerial access network (AAN) system is described. The method is performed by multiple control layer units, multiple forwarding layer units, and multiple access layer units. The method includes performing, by a first control layer unit in the multiple control layer units, first data transmissions between a ground base station and a subset of the multiple forwarding layer units that are managed by the first control layer unit, performing, by a first forwarding layer unit in the managed subset of the multiple forwarding layer units, second data transmissions between at least one access layer unit in the multiple layer units that are associated with the first forwarding layer unit and one of the first control layer unit or the ground base station, and performing, by a first access layer unit in the at least one access layer unit, third data transmissions between the first forwarding layer unit and at least one user equipment (UE) associated with the first access layer unit.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
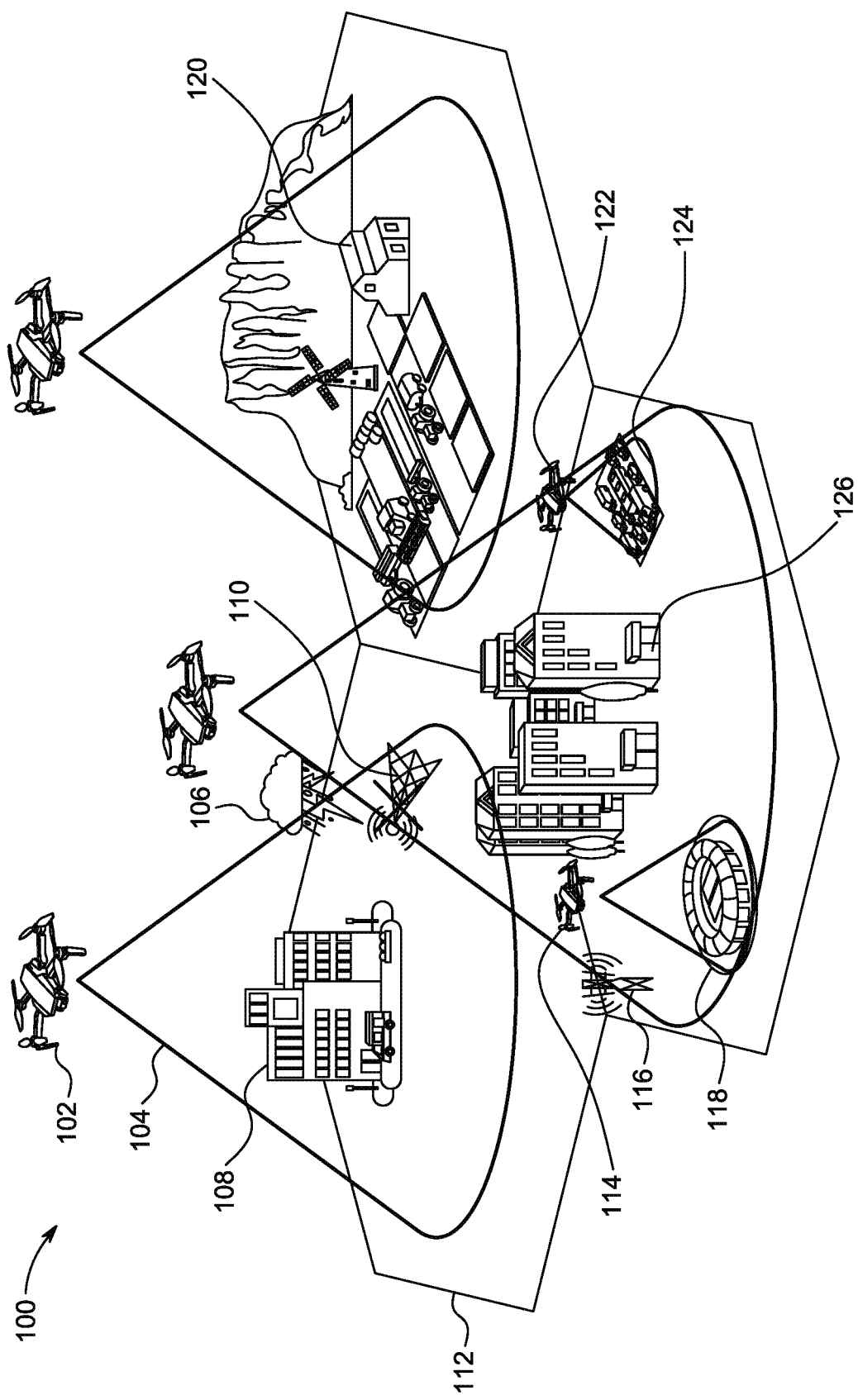
FIG. 1 shows an overview of a network model for dynamic deployment of aerial network service provider devices, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

FIG. 1 shows an overview of a network model for dynamic deployment of aerial network service provider devices, in accordance with one aspect of the present disclosure. In one implementation, the aerial network service provider devices are deployed by Internet Service Providers (ISPs) in emergencies, overloaded scenarios, and regions lacking infrastructure. The aerial network service provider devices, in one example, can be an airborne autonomous vehicle, such as an Unmanned Aerial Vehicle (UAV).

Usage of UAVs may be categorized into two ways. First, a UAV is implemented as a part of wireless communication infrastructure, for example, as a mobile base station or anchor for the localization of Internet of Things (IoT) devices. Second, the UAV is implemented as a mobile terminal, for example, as an aerial user equipment, where the data generated by the payload of the UAV needs to be transmitted to serve an application. UAVs can easily fly and dynamically change their positions to ensure extensive coverage to a given area within the minimum possible time and at a low operating cost. Therefore, the UAV-mounted base stations can provide fast and ubiquitous connectivity in public safety scenarios.

In one aspect, the UAVs are used as on-demand forward switches in an SDN environment to provide dynamic coverage as a solution to the fixed cell-based deployment of the 5G architecture. In another aspect, the UAVs are implemented as an air-ground network integrating high-altitude platforms (HAP), and low altitude platforms (LAP) of UAVs with existing cellular network framework using SDNs separated layers. Depending on the application, ISPs may dynamically deploy the UAV swarms. For example, in 5G, the micro-cell is limited to 1 km in range, while the pico-cell ranges up to 200 meters and the femto-cell for more small dense regions 30 meters or less.

FIG. 1 depicts three examples of UAV communication applications in the civilian domain. A first example is a disaster-stricken area with damaged ground-based macro-BS. A second example depicts dense-metro areas with high buildings blocking LoS and regions with ultra-dense user terminals. A third example shows the use of the UAV communication in rural or remote areas which lack permanent ground-based infrastructure. UAV swarms can serve as base stations in an area affected by natural disasters, such as earthquakes, fires, and floods that yield to severe damage or complete destruction of the existing terrestrial communication networks. The UAV swarms may serve as an additional infrastructure in dense-metro areas with high buildings blocking LoS and regions with ultra-dense user terminals, and as an air-born infrastructure replacing the ground-based infrastructure in the absence of the ground-based infrastructure. In some examples, the UAV serves as a cellular base station and ground communication infrastructure to provide the cellular network to UEs 220 (see FIG. 2A).

Referring to FIG. 1, the Aerial Access Network (AAN) System is implemented to provide network coverage for a limited area, in accordance with one implementation. In the first example, sUAV 102 are deployed as a base station for limited area access within the larger macro-base station (MBS) zone 112. A natural disaster zone 106 indicates a zone where an MBS 110 is damaged due to a natural disaster. For example, the MBS 110 may be damaged due to heavy rain and flood in the area. Due to the damaged MBS, the cellular network coverage may no longer be operational until the MSB is repaired. As an example, a healthcare provider 108, such as a hospital, may lose the cellular network, jeopardizing the entire healthcare operation. Therefore, the AAN is deployed in the MBS zone to serve as base stations for providing temporary cellular communication and internetworking access until the MBS is repaired, allowing UEs, such as smartphones, computing devices of healthcare systems and networks, and the like, in the connectivity zone to function normally.

In accordance with the second example, the AAN system is implemented in the dense-metropolitan area. In the dense-metropolitan area, such as a densely populated residential area with a large number of UEs 220 requiring cellular connectivity or a stadium with thousands of UEs 220, utilization of a small macro base station 116 (SBS) is inadequate. SBS 116 would be incapable of providing service coverage to all UEs 220 in a dense zone 118. A pico-cell of range~200 m is deployed by a UAV access layer unit 114 to enable frequency reuse within the spectrum band in the range, allowing for more concurrent connections and off-loading traffic from the SBS 116. Further, due to LoS obstacles, such as buildings 126 with 5G base stations, access UAV devices provide an unobstructed communication link with UEs 220, flying above the buildings. For congested roads with a dense number of vehicles and UEs 220 in a small region, the femto-cell (range<30 m) UAV access layer unit 114 is deployed to off-load traffic from nearby SBS or MBS through frequency optimization via spectrum band reuse.

The third example in implemented for rural area 120 or remote areas. Rural area 120 is a remote area that lacks infrastructure. UAV access layer units can be deployed to provide cellular and internetworking access.

Figure 2A:
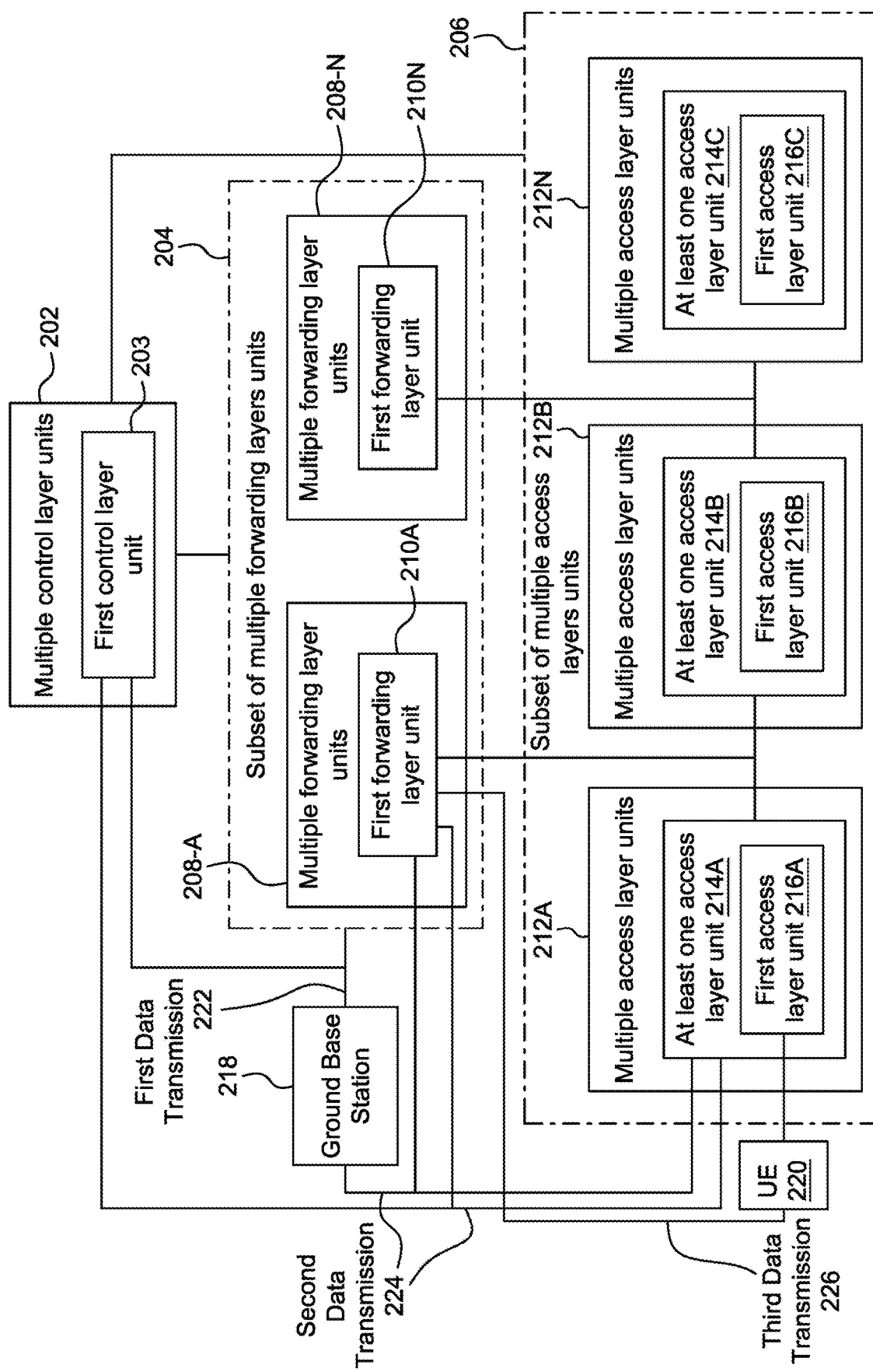
FIG. 2A depicts a block diagram of an AAN system, according to certain embodiments.

FIG. 2A depicts a block diagram of an AAN system, referred to as the system, hereinafter, in accordance with on embodiment. The system is based upon a multi-hierarchical architecture. The multi-hierarchical aerial computing network includes High Altitude Platforms (HAP) and UAVs floating in the air as an aerial base station (as shown in FIG. 1) to provide a multi-access edge network for terrestrial IoT devices, referred as to user equipment (UE) 220, such as a surveillance camera, a smart wearable device, a smart framing device, and other IoT equipment in disasters and remote area. HAPs are aircraft, such as UAVs or airplanes, positioned at high altitudes. In the telecommunication or cellular communication field, the UAVs can be considered to perform as an aerial base station to serve ground users, as an aerial anchor to localize ground devices, as an aerial cellular user, and as a terminal in cellular UAV to UAV communication.

With reference FIG. 2A, the system is the multi-hierarchical architecture that includes at least three layers, referred to as a control layer, a forwarding layer, and an access layer. To perform the functionality of each layer, HAPs and UAVs together are implemented, as UAVs are equipped with cellular components configured to form a cellular network based on the AAN architecture topology. Components of the control layer form a control layer unit. In one implementation, multiple control layer units 202 can be implemented in the system. Components of the forwarding layer form a forwarding layer unit. In one implementation, a subset of multiple forwarding layer units 204 includes a plurality of multiple forwarding layer units, referred to as 208A, 208-B . . . 208N, collectively and interchangeably referred as to 208. The multiple forwarding layer unit 208 includes first forwarding layer unit 210-A, second forwarding layer unit 210-B, to an Nth forwarding layer unit 210-N, and so on, collectively and interchangeably referred to as 210. Components of the access layer form an access layer unit. In one implementation, a subset of multiple access layer units 206 includes a plurality of multiple access layer units, referred to as 212A, 212-B . . . 212N, collectively and interchangeably referred to as 212. The multiple access layer units 212 include first access layer unit 216-A, second access layer unit 216-B, and so on, collectively and interchangeably referred to as 216.

In one implementation, the multiple control layer units 202 may be implemented for serving multiple networks. First control layer unit 203 of the multiple control layer units 202 is configured to administrate multiple forwarding layer units 208. The multiple forwarding layer units 208 are connected to the control layer units 202 and the ground base station 218 by data links. In one example, the first forwarding layer unit 210-A may receive a data package from the first control layer unit 203 of the multiple control layer units 202 or second forwarding layer unit 210-B, or any other forwarding layer unit of the multiple forwarding layer units 208. Further, the access layer comprises multiple access layer units 212. The multiple access layer units 212 are administrated by at least one forwarding layer unit, for example, the first forwarding layer unit 210-A. According to an aspect of the present disclosure, the first forwarding layer unit 210-A may administrate a first set of multiple access layer units 212-A, the second forwarding layer unit may administrate a second set of multiple access layer units 212-B, and so on.

In one aspect, the UAV is implemented as an aerial base station administrating the control layer. Multiple UVAs can be implemented to perform the functionality of the multiple control layer units 202, where the multiplicity of the UVAs can be based on optimization of multiple metrics, such as transmission power, the trajectory of the UAVs, the total energy consumption of UAVs and UEs 220 connected in the AAN network. The control layer units 202 host Software-Defined-Networking (SDN) control plane entities to monitor link changes of the forwarding layers and the access layers. SDN switches are implemented for simplifying network management, deployment, and operation by disaggregating network control and forwarding functions from individual switches and routers, placing them instead in a centralized SDN controller.

The first layer of the AAN system, the control layer is configured to transport large amounts of traffic quickly and efficiently to the forwarding layer or the access layer. The control layer consists of multiple control layer units 202, for example, first control layer unit 203, second control layer unit, third control layer unit, and so on. In one example, the first control layer unit 203 of the multiple control layer units 202 is configured to manage a subset of the multiple forwarding layer units 204 and a subset of the multiple access layer units 206 and perform first data transmissions 222 between the managed subset of the multiple forwarding layer units 204 and a ground base station 218. In cellular communications, the ground base station 218 is a wireless communications station installed at a fixed location and communicates as part of a cellular CDMA or GSM cell site.

In an aspect, the first control layer unit 203 is further configured to receive a request for a flow rule of a data packet from the first forwarding layer unit 210-A of multiple forwarding layer units 208, generate the flow rule of the data packet based on an optimal network route of the data packet, and send the flow rule to the first forwarding layer unit 210-A.

In an aspect, the first control layer unit 203 is further configured to determine whether a received data packet is sent from a core network. Based on the determination that the received data packet is sent from the core network, the first control layer unit 203 is configured to determine whether to send the received data to the first forwarding layer unit 210-A based on whether a destination of the received data packet is in a network topology of the first control layer unit 203. Further, if it is determined that the received data packet is not sent from the core network, the received data packet is sent to the core network by the first control layer unit 203.

In an aspect, the first control layer unit 203 is further configured to send the received data packet to the first forwarding layer unit 210-A based on the destination of the received data packet being in the network topology of the first control layer unit 203 and discard the received data packet based on the destination of the received data packet not being in the network topology of the first control layer unit 203.

In an aspect, the first control layer unit 203 is further configured to monitor local link changes of the managed subset of the multiple forwarding layer units 208 and the managed subset of the multiple access layer units 212; and update a route for transmitting and receiving a data packet within a local domain of the first control layer unit 203.

In an aspect, data transmission between the first access layer unit 216-A and a second access layer unit 216-B in the multiple access layer units 212 is performed without accessing the ground base station 218, where the second access layer unit 216-B is managed by a second control layer unit in the multiple control layer units 202.

To perform the aforementioned functionalities that the first control layer unit 203 is configured to perform, the control layer unit 203 comprises high-speed network devices, such as high-end routers and switches with redundant data links. The control layer is capable of transmitting the data packets and interconnecting multiple components, such as forwarding layer unit 210, access layer unit 216, ground base station 218, and the like, connected within the network topology. In an example where multiple geographically separated networks are considered, multiple control layer units 202 can be implemented to merge the separated networks. For merging, control layer routers can be implemented on each control layer unit 203 for moving data packets from one network to another. In another example, one UVA is mounted as an aerial base station functioning as a control layer unit 203 administrating the corresponding single network topology.

The middle layer is a forwarding layer. The forwarding layer serves as a communication platform between the access layer and the control layer. The first forwarding layer unit 210-A in the managed subset of the multiple forwarding layer units 208 is configured to be associated with at least one access layer unit in the managed subset of the multiple access layer units 212 and perform second data transmissions 224 between the at least one access layer unit and one of the first control layer unit 203 or the ground base station 218.

In an aspect, the first forwarding layer unit 210-A is further configured to receive a flow rule from the first control layer unit 203 and update a flow table of the first forwarding layer unit based on the received flow rule. The flow tables are the fundamental data structure in an open flow device. Each flow table in the switch contains a set of flow entries. These flow tables allow the unit to inspect incoming data packets based on certain files and take proper action according to the contents of the data packet and information that has been received.

The first forwarding layer unit 210-A is further configured to receive a data packet from one of the first access layer unit 216-A, a second forwarding layer unit 210-B in the multiple forwarding layer units 208, or the first control layer unit 203 and determine whether a destination port of the data packet is in a flow table of the first forwarding layer unit. If the destination port of the data packet is in the flow table of the first forwarding layer unit 210-A, the data packet is sent through the destination port to one of the first access layer unit 216-A or another forwarding layer unit in the multiple forwarding layer units 208. If the destination port of the data packet is not in the flow table of the first forwarding layer unit 208, a request for a flow rule of the data packet is sent to the first control layer unit 203.

The forwarding layer consists of routers and multilayer forwarding switches. The forwarding layer is configured to provide routing and establish communication between the control layer and the ground base station 218 when the control layer is not provided with a data link to the ground base station 218. For example, when the data packet is to be transmitted to the ground base station 218 from the control layer, and the control layer has no data link to connect with the ground base station 218, the forwarding layer receives the data packet and transmits the data packet to the ground base station 218. In some examples, when the data packet has to be transmitted to the ground base station 218 from the forwarding layer, and the forwarding layer has no data link to the ground base station 218, the data packet is transmitted to the control layer, and the control layer transmits the data packet the ground base station 218. Thus, the forwarding layer facilitates data packet transmission between the control layer and the access layer or the ground base station 218. The forwarding layer is also configured to optimize the accessing of the service request, for example, the way in which a data packet is transmitted to the access layer or the control layer.

The third layer of the AAN system is the access layer. The access layer unit administers the access layer 216 which includes switches and access points that provide connectivity between the access layer unit and the UEs 220. The first access layer unit 216-A in the at least one access layer unit is configured to be associated with at least one UE 220 and performs third data transmission 226 between the first forwarding layer unit 210-A and the at least one UE 220. For that purpose, the access layer also includes cellular components, such as a Remote Radio Head (RRH), Baseband Unit (BBU), and Baseband Resource Pool (BRP). RRH is a remote radio transceiver that connects to an operator radio control panel via the electrical or wireless interface. BBU is a device that interprets baseband frequencies in telecom systems including computer networks, the Internet, phone networks, and radio broadcasting systems. BBU converts the signal to digital signals and resides in the ground station within a larger cluster of BBUs, referred to as BRP.

In an aspect, the first access layer unit 216-A is further configured to receive a connection request from one of the at least one UE 220. If the UE 220 is not registered in the network, then the UE 220 is registered with network management applications before the connection request is granted.

In an aspect, the first access layer unit 216-A is further configured to receive a data packet from the first forwarding layer unit 208 and determine whether a destination port of the data packet is in a flow table of the first access layer unit 216-A. Further, based on a determination that the destination port of the data packet is in the flow table of the first access layer unit 216-A, the data packet is sent through the destination port to one of the at least one UE 220. If the destination port of the data packet is not in the flow table of the first access layer unit 216-A, the data packet is sent to the first forwarding layer unit 210-A.

Each layer of the AAN system is interconnected by fronthaul links. The fronthaul link in communication architecture is an intermediate link between the centralized radio controller and the radio heads at the edge of a cellular network. Reference numerals 228, 230, 242, 244, and 246 are the fronthaul links between UAVs and UAVs-to-Infrastructure using physical layer techniques 220, for example, a combination of 3D massive Multiple-In Multiple-Out (MIMO), which is a technology in which base stations are equipped with a very large number of antenna elements to improve spectral and energy efficiency with millimeter-wave antenna arrays using non-orthogonal multiple access (NOMA) transmission, which is a technology that can serve multiple users using the same time and frequency resources, where each user operates in the same band and at the same time and the users are distinguished by their power levels or Free-space Optical (FSO) communication, which is a technology that uses light propagating in free space to wirelessly transmit data.

In one implementation of the embodiment, the AAN is connected to the core network or the Internet, via the backhaul link. The backhaul link is a fiber optic cable that serves as an intermediate communication link between a side of the network that communicates with the global internet or other core network access location. A core network is a part of a computer network that interconnects networks, providing a path for the exchange of information between different Local Area Networks (LAN) or subnetworks. The core network ties together diverse networks in the same building, in different buildings in a campus environment, or over wide areas. The core network's capacity is greater than the networks connected to the core network.

Figure 2B:
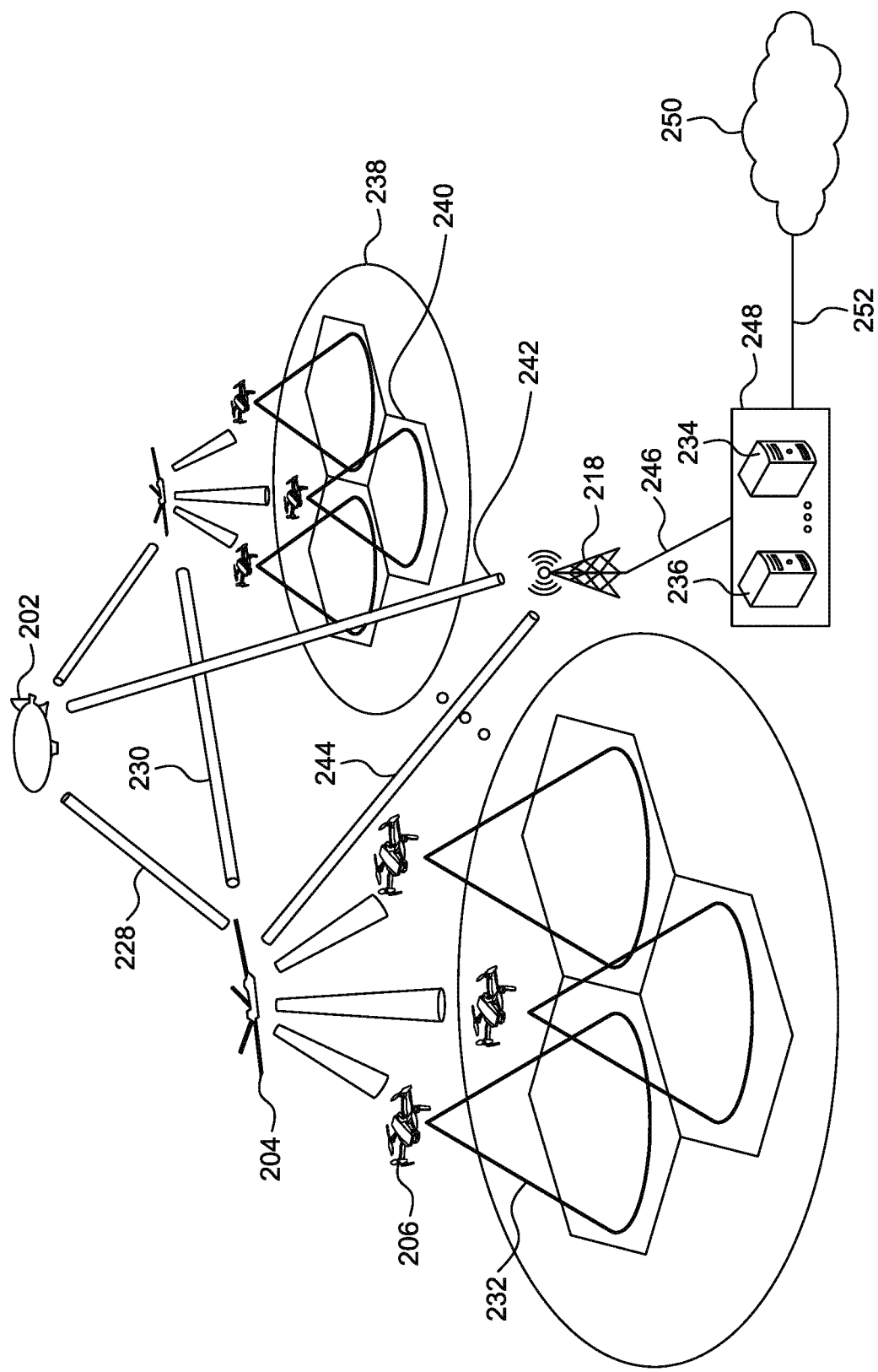
FIG. 2B depicts a system architecture, according to certain embodiments.

FIG. 2B depicts a system architecture in accordance with one or more aspects of the present disclosure. The AAN system is implemented in a multi-tier architecture which is separated into three primary layers, control layer, forwarding layer, and access layer.

The control layer includes a plurality of control layer units which host SDN control plane entities for monitoring link changes of forwarding layers (204) and access layers (204), respectively. The plurality of control layer units also performs local optimizations, such as monitoring local link changes of the forwarding layer units 208 and access layer units 212, by managing and updating the best routes within its local domain. In addition, the multiple control layer units 202 provide redundant routes to the ground base station 218 if the forwarding layer unit 210 does not have a direct link 242 to the ground base station 218.

The forwarding layer unit 210 is configured to perform the network function of a data forwarding entity, e.g., a switch in SDN networks. The data forwarding entity receives data packets from the multiple the access layer units 212 and forwards the data packet to designated ports prescribed by an administrating control layer unit 203. The data packets designated for core network 250 are forwarded to ground base station 218 if the forwarding layer unit 210 has a direct link 244, otherwise the forwarding layer unit 210 forwards the core network packet to the control layer unit 203, and the control layer unit 203 then forwards the packet to the ground base station.

The access layer units 206 provide network access to one or more ground UEs 220 within a range as depicted by conical area 232. The range of the access layer unit is referred to as a micro-cell 240. Multiple micro-cells form a macro-cell 238. One macro-cell is managed by one forwarding layer unit 210, and multiple macro-cells are managed by a single control layer unit. Multiple control layer units form the AAN.

The access layer units 206 include one or more cellular components including a remote radio head (RRH) which is an antenna array used to establish a connection between the access layer units 206 and UEs, a baseband unit (BBU) 234 which converts the received signal to digital signals and is implemented on the ground station within a larger cluster of BBUs 234, referred as to the baseband resource pool (BRP) 236. The backhaul link 252, which is a fiber optic cable, connects the network to the core network and to the internet 250. Labels 228, 230, 242, 244, and 246 are fronthaul links between UAVs and UAVs-to-Infrastructure using physical layer techniques, for example, 3D massive multiple-input multiple-output (MIMO) mmwave antenna arrays using non-orthogonal multiple access (NOMA) transmission, or free-space optical (FSO) communication.

Figure 3:
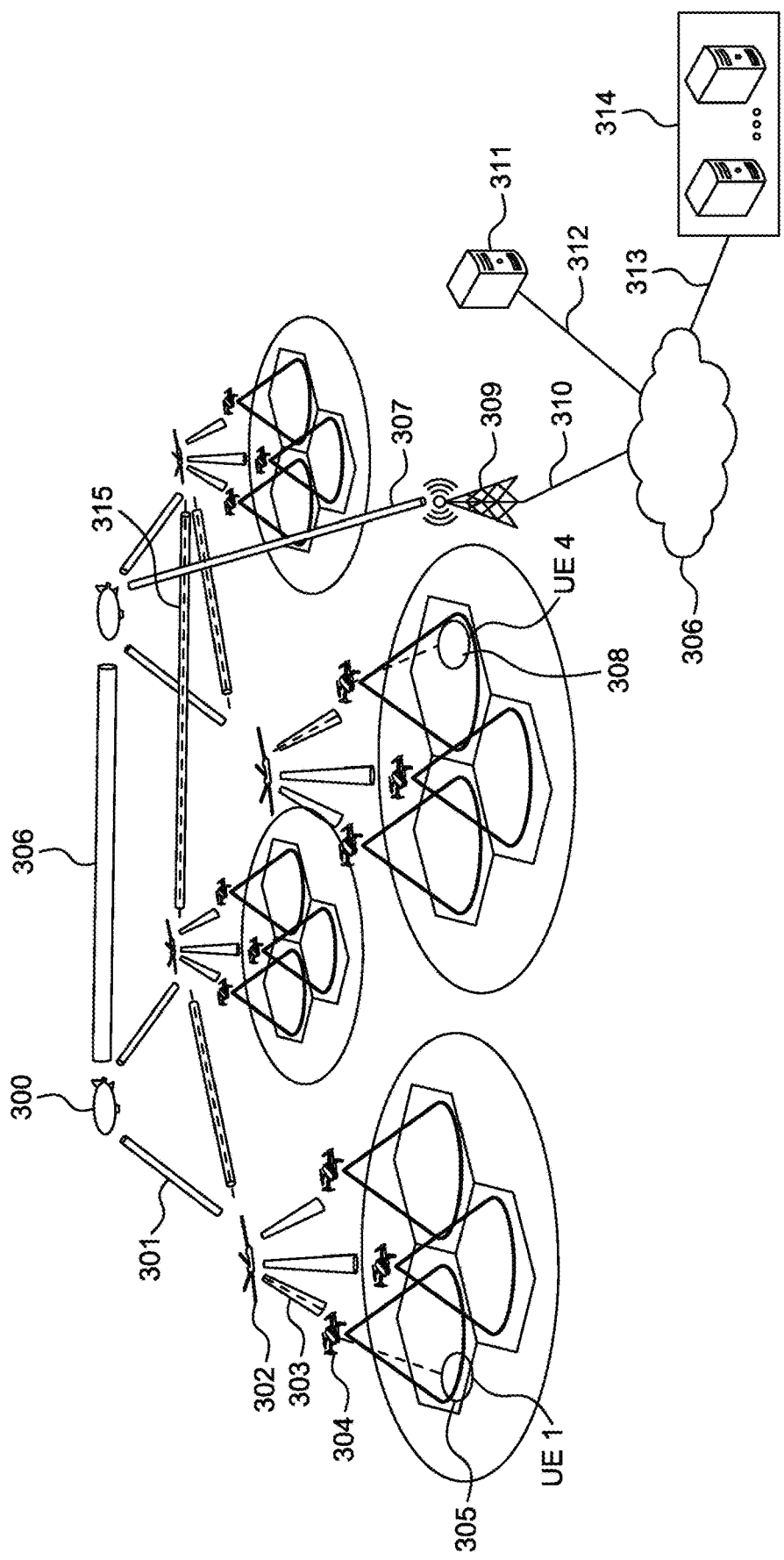
FIG. 3 depicts a SDN model for AAN system, according to certain embodiments.

FIG. 3 depicts an SDN model for AAN system, in accordance with one or more aspects of the present disclosure. Hierarchical SDN controllers are configured to monitor network link changes between the forwarding layer units and the access layer unit and perform administrative duties. The hierarchical SDN controllers are defined by a plurality of control layer units 300, referred to as the control layer units 300, individually or collectively. Each control unit is implemented in at least the local domain and is configured to administrate over the respective local domain. A plurality of global controllers 314, referred to as global controller 314, individually or collectively, are configured to perform global optimization of network management applications, such as global route optimization, load balancing, energy and resource management, and formation control. The optimization is performed by accessing the global controllers 314 through the northbound API of SDN. The optimization process is performed in background of the core network 306 by controller 311 and link 312 between the core network 306 and the controller 311. The core network 306 and link 313 between the global controllers 314 and the core network 306 describe synchronization of topologies using SDN East/West API techniques.

Edge networking aspect of the SDN model is depicted by a line 315 between UE1 305 and UE4 308. The data packet does not leave the AAN, unlike in the system of FIG. 2B which requires the data packet to travel to and from the ground-based core access network 306 through the ground base station 309 through the fronthaul links 307 and 310.

A data link 301 establishes connection between the control layer units 300 and forwarding layer unit 302 using the SDN southbound API, for example, OpenFlow protocol. The access layer units 304 are connected to forwarding layer units 302 using beamforming links 303.

Figure 4:
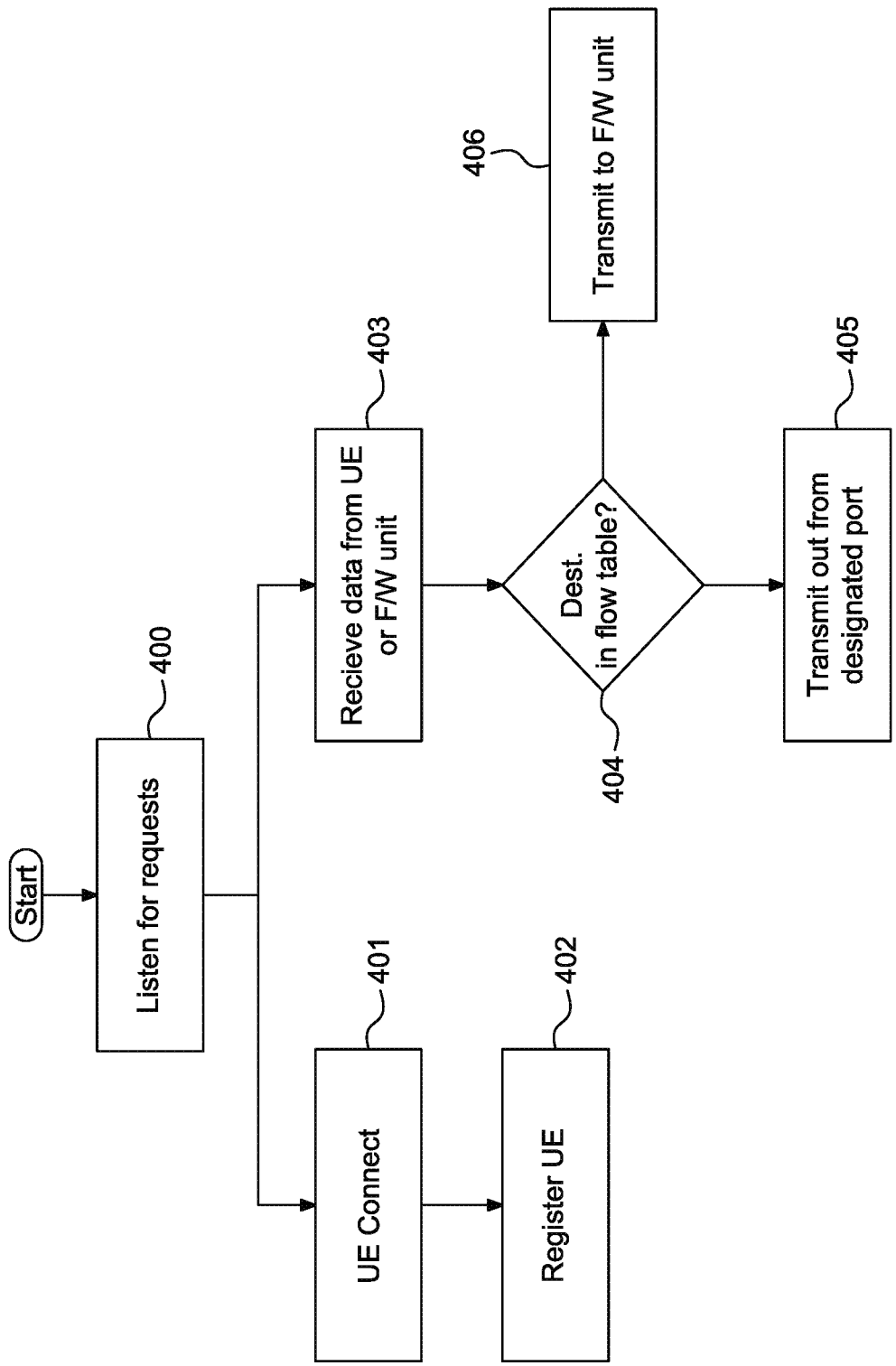
FIG. 4 is a flow chart depicting a core logic of access layer units, according to certain embodiments.

FIG. 4 is a flow chart depicting the core logic of the access layer units, in accordance with an aspect of the present disclosure. The access layer units, at block 400, listen for connection accessibility requests from UEs. When a connection request is received at block 401, the access layer unit 216 registers the UE with network management applications 402. In one implementation, after the UE is registered, the UE may request data transmission. The data transmission is the core network function of the access layer units 216. In another implementation, the forwarding layer units 210 may forward data packets to the access layer unit 216 for designated UE terminals at block 403. The system includes a flow table with a compilation of destination ports connected within the network. At block 404, it is determined whether the destination port of the data packet is present in the flow table. If yes, then the data packet is forwarded/transmitted to the destination port at block 405. However, if the destination port is not present in the flow table, the access layer unit 216 transmits the data packet to the forward layer units 210 at block 406. The forward layer unit 210 then transmits the data packet to the destination port.

Figure 5:
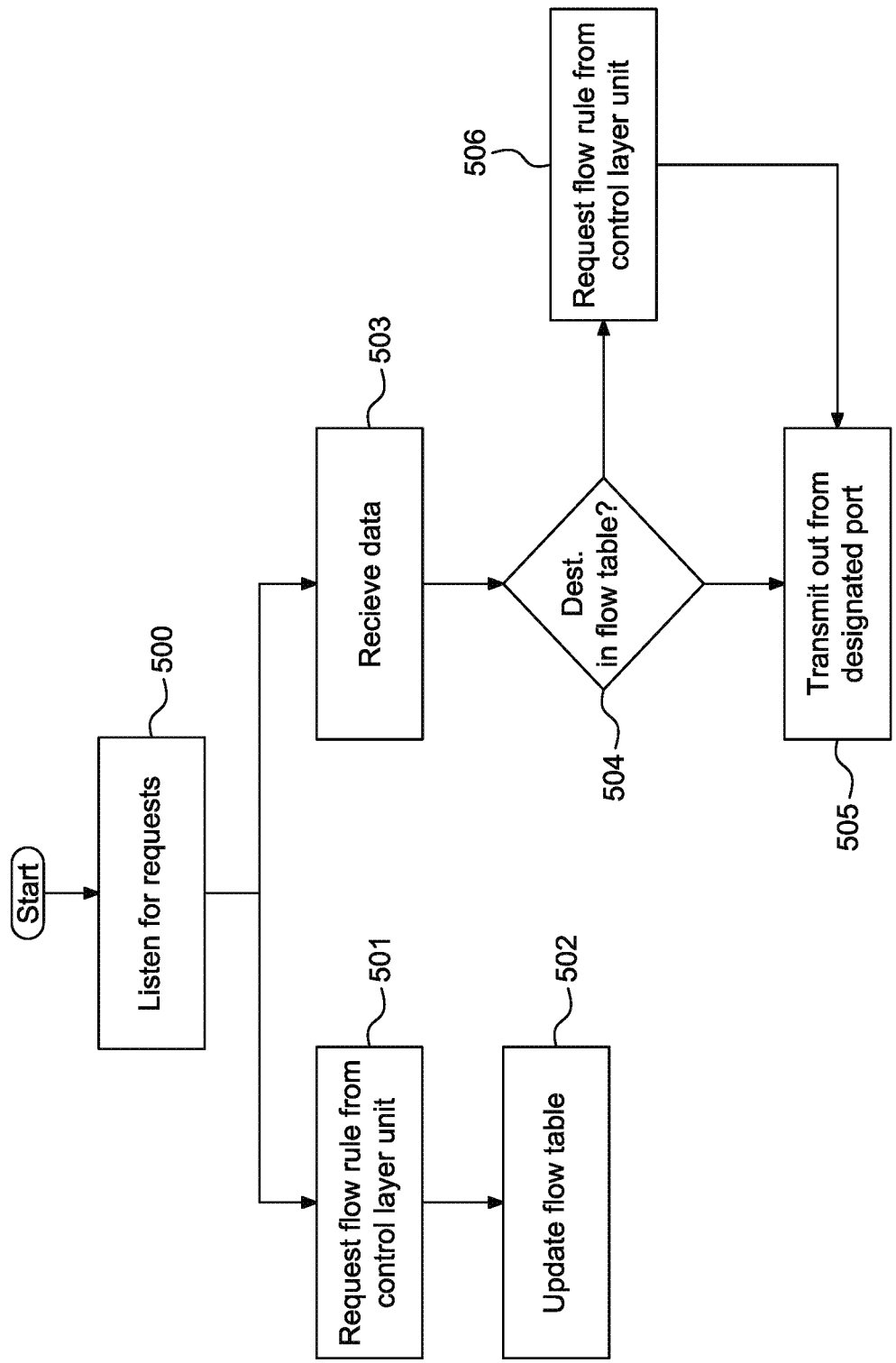
FIG. 5 is a flow chart depicting a core logic of forwarding layer units, according to certain embodiments.

FIG. 5 is a flow chart depicting the core logic of the forwarding layer units 210, in accordance with one or more aspects of the present disclosure. The forward layer units 210, at block 500, listen for requests from at least one of the access layer units 216, peer forward layer units, or the control layer units 202. When a data packet is received at block 503, the forward layer unit 210 determines whether the flow rule is listed in the flow table, at block 504. If the flow rule is listed in the flow table, the forward layer unit 210 transmits the data packet to the destination port, at block 505, towards the peer forward layer units 210 or the access layer units 216. If the flow rule is not listed in the flow table, the forward layer unit 210 sends a request to the control layer unit 203 requesting an assigned flow rule for the data packet at block 506. A flow rule configuration can be acquired by the control layer unit 203 for the data packet at block 501. Upon receiving a new flow rule from the control layer unit 203, the forward layer unit 210 updates the flow table with the new flow rule, at block 502.

Figure 6:
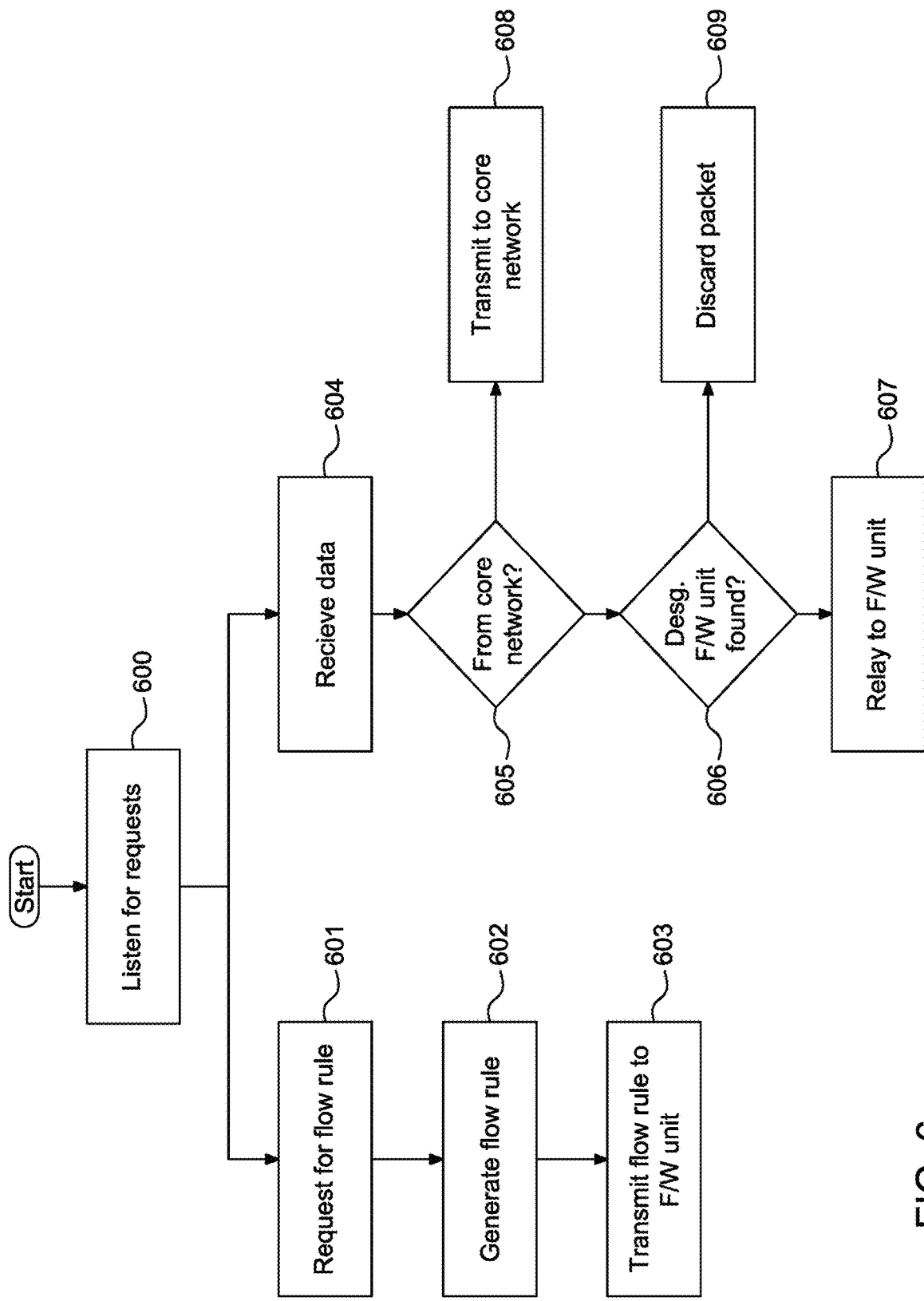
FIG. 6 is a flow chart depicting a core logic of the control layer units, according to certain embodiments.

FIG. 6 is a flow chart depicting the core logic of the control layer unit 203, in accordance with one aspect of the present disclosure. The control layer unit 203, at block 600, listens for requests from the forwarding layer units 208 and the core network entities, such as ground base station 218. The control layer unit 203 is configured firstly to administrate the flow rule table requests received from the forward layer units 208 at block 601. Upon receiving the request, the control layer unit 203 generates a flow rule by checking its optimal network routes in the full topology using routing optimization applications, at block 602 and transmits the generated rule to the forward layer unit 210 at block 603. The control layer unit 203 is further configured to relay data packets to the ground base station 218, and from the ground base station 218 to the forward layer units 208 as a redundant route if the forward layer units 208 do not have access to the core network via the data link to ground base station 218 at block 604. When the data packet is received, the control layer unit 203 checks if the data packet is from the core network at block 605. If the data packet is from the core network, the control layer unit 203 identifies the destination port for the data packet in its network topology at block 606. If the destination port is present in the network topology, then the data packet is forwarded to the forward layer unit 210 corresponding to the destination port at block 607. However, if the destination port is not present in the network topology, the control layer unit 203 discards the data packet at block 609. Additionally, if the data packet received is from the forward layer unit 210, the destination port must be in the core network, therefore, the data packet is transmitted to the ground base station 218, at block 608.

Figure 7:
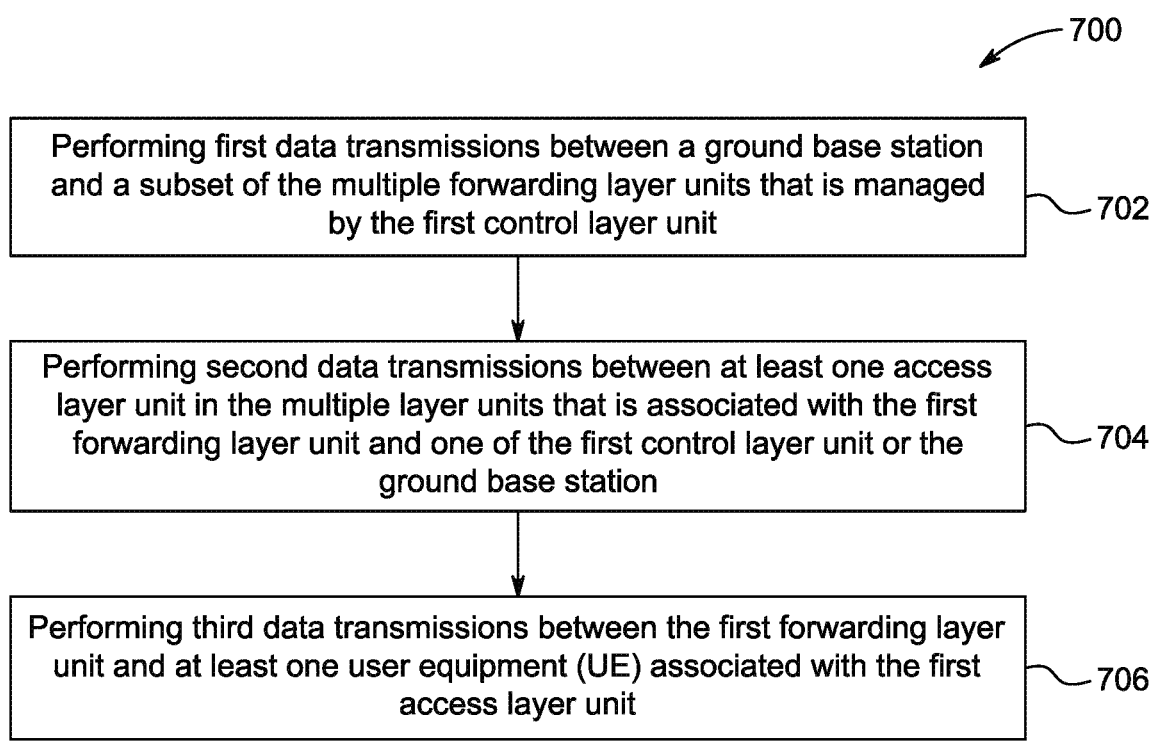
FIG. 7 shows a flow diagram of a method for providing a network service using an aerial access network (AAN) system, according to certain embodiments.

FIG. 7 shows a flow diagram of a method for providing a network service using an aerial access network (AAN) system, in accordance with one embodiment. The AAN system includes multiple control layer units 202, multiple forwarding layer units 208, and multiple access layer units 212. These layer units are arranged in multi-hierarchical tiers forming a network topology. A control layer unit 203 can administrate multiple forwarding layer units 208. A forwarding layer unit 210 of the multiple forwarding layer units 208 can administrate multiple access layer units 212. Each access layer unit 216 can connect to multiple UEs 220. In the network topology, the control layer unit 203 and the forward layer unit 210 are connected to a ground base station 218 for forming a cellular network via a respective data link. However, if the control layer unit 203 is not connected directly to the ground base station 218 via a data link, the control layer unit 203 can communicate with the ground base station 218 via the forward layer unit 210.

Referring back to the FIG. 7, at method step 702, first data transmissions 222 between a ground base station 218 and a subset of the multiple forwarding layer units 204 that is managed by the first control layer unit 203 is performed, by a first control layer unit 203 in the multiple control layer units 208.

At method step 704, second data transmissions 224 between at least one access layer unit in the multiple access layer units 212 that is associated with the first forwarding layer unit 210-A and one of the first control layer unit 203 or the ground base station 218 is performed, by the first forwarding layer unit 210-A in the managed subset of the multiple forwarding layer units 204.

At method step 706, third data transmissions 226 between the first forwarding layer unit 210-A and UE 220 associated with the first access layer unit 216-A is performed, by the first access layer unit 216-A in the at least one access layer unit.

To establish and perform functionalities of the AAN system, the method further includes one or more method steps. In some example implementations, the method 700 includes receiving, by the first access layer unit 216-A, a connection request from one of the at least one UE 220, and registering, by the first access layer unit 216-A, the one of the at least one UE 220 with network management applications.

In an aspect of the present disclosure, the method 700 includes receiving, by the first access layer unit 216-A, a data packet from the first forwarding layer unit 210-A, and determining, by the first access layer unit 216-A, whether a destination port of the data packet is in a flow table of the first access layer unit 216-A. The method further includes sending, by the first access layer unit 216-A, the data packet through the destination port to one of the at least one UE 220, in response to a determination that the destination port of the data packet is in the flow table of the first access layer unit 216-A. The method further includes sending, by the first access layer unit 216-A, the data packet to the first forwarding layer unit 210-A, in response to a determination that the destination port of the data packet is not in the flow table of the first access layer unit 216-A.

In some exemplary implementations, the method 700 includes receiving, by the first forwarding layer unit 210-A, a flow rule from the first control layer unit 203, and updating, by the first forwarding layer unit 210-A, a flow table of the first forwarding layer unit 210-A based on the received flow rule.

In certain exemplary implementations, the method 700 includes receiving, by the first forwarding layer unit 210-A, a data packet from one of the first access layer unit 216-A, a second forwarding layer unit in the multiple forwarding layer units, or the first control layer unit 203.

The method 700 further includes determining, by the first forwarding layer unit 210-A, whether a destination port of the data packet is in a flow table of the first forwarding layer unit 210-A. Based upon the determination, the data packet is sent, by the first forwarding layer unit 210-A, through the destination port to one of the first access layer unit 216-A or second forwarding layer unit in the multiple forwarding layer units 208, in response to a determination that the destination port of the data packet is in the flow table of the first forwarding layer unit 210-A. If it is determined that the destination port of the data packet is not in the flow table of the first forwarding layer unit 210-A, then a request for a flow rule of the data packet to the first control layer unit 203 is sent by the first forwarding layer unit 210-A.

In an aspect of the present disclosure, the method 700 includes receiving, by the first control layer unit 203, a request for a flow rule of a data packet from the first forwarding layer unit 210-A, generating, by first control layer unit 203, the flow rule of the data packet based on an optimal network route of the data packet, and sending, by the first access layer unit 216-A, the flow rule to the first forwarding layer unit 210-A.

In an aspect of the present disclosure, the method 700 includes determining, by the first control layer unit 203, whether a received data packet is sent from a core network. In response to the determination that the received data packet is sent from the core network, the method 700 includes determining, by the first control layer unit 203, whether to send the received data to the first forwarding layer unit 210-A based on whether a destination of the received data packet being in a network topology of the first control layer unit 203. Further, in response to a determination that the received data packet is not sent from the core network, the method 700 includes sending, by the first control layer unit 203, the received data packet to the core network.

In an aspect of the present disclosure, the method 700 includes sending, by the first control layer unit 203, the received data packet to the first forwarding layer unit 210-A based on the destination of the received data packet being in the network topology of the first control layer unit 203, and discarding, by the first control layer unit 203, the received data packet based on the destination of the received data packet not being in the network topology of the first control layer unit 203.

In an aspect of the present disclosure, the method 700 includes monitoring, by the first access layer unit 203, local link changes of the managed subset of the multiple forwarding layer units 208 and the managed subset of the multiple access layer units 206, and updating, by the first control layer unit 203, a route for transmitting and receiving a data packet within a local domain of the first control layer unit 203.

In an aspect of the present disclosure, a data transmission between the first access layer unit 216-A and a second access layer unit 216-B in the multiple access layer units 212 is performed without accessing the ground base station 218, the second access layer unit 216-B being managed by a second control layer unit in the multiple control layer units 202.

The system and methods as described above contribute to the AAN and results in advantages as listed herein. The system and methods of the present disclosure provides dynamic network service capability for ISPs and governmental disaster recovery services in emergency scenarios and overloaded situations, enables frequency band reuse using layered UAV solution, as pico- and femto-cells can be dynamically deployed for changing conditions. Frequency reuse allows for more customer terminals to simultaneously access the network in dense areas. The present disclosure also contributes to minimizing network degradation due to damaged macro base stations (MBS) from natural disasters or malicious attacks with fast, dynamic deployment of aerial service provider units. The system can be implemented near healthcare providers. The present disclosure permits, in a first aspect, the multi-tier aspect of the architecture to achieve scalable deployment of the service provider units, and in a second aspect, continuous management of UAV service provider units in situations with link failures with ground base stations, for example, obstruction due to atmospheric conditions, damaged MBS from natural events or malicious attacks. The system and methods of the present disclosure offer seamless integration with ISPs autonomous system separation architecture with SDN backends, ISPs with centralized control of the aerial units, allowing on-demand formation control and node management. The architecture of the present disclosure can be deployed using high-frequency band radio signals with short-range capacities and/or LoS limitations. The methods and system of the present disclosure provide moving network access may deploy UAV access providers for continuous coverage, decreases latency between network packets sent within the network, improving throughput. The present disclosure promotes multi-path routing, reducing packet loss if links are disrupted, updates network router faster when a link between forwarding switches changes, as the control layer units are directly connected, improving performance, and permits load-balancing to occur at the controller application level.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:
1. An aerial access network (AAN) system, comprising:
multiple control layer units, multiple forwarding layer units, and multiple access layer units, wherein the control layer units comprise airships and the forwarding layer units comprise UAVs, and the airships of the control layer units are at a higher attitude than UAVs of the forwarding layer units;

further wherein:
a first control layer unit in the multiple control layer units is configured to:
  manage a subset of the multiple forwarding layer units and a subset of the multiple access layer units, and
  perform first data transmissions between the managed subset of the multiple forwarding layer units and a ground base station;
a first forwarding layer unit in the managed subset of the multiple forwarding layer units is configured to:
  be associated with at least one access layer unit in the managed subset of the multiple access layer units, and
  perform second data transmissions between the at least one access layer unit and one of the first control layer unit or the ground base station;
a first access layer unit in the at least one access layer unit is configured to be associated with at least one user equipment (UE),
  perform third data transmissions between the first forwarding layer unit and the at least one UE,
  receive a data packet from the first forwarding layer unit;
  determine whether a destination port of the data packet is in a flow table of the first access layer unit;
  in response to a determination that the destination port of the data packet is in the flow table of the first access layer unit,
    send the data packet through the destination port to one of the at least one UE; and
  in response to a determination that the destination port of the data packet is not in the flow table of the first access layer unit,
    send the data packet to the first forwarding layer unit.

2. The AAN system of claim 1, wherein the first access layer unit is further configured to:
  receive a connection request from one of the at least one UE; and
  register the one of the at least one UE with network management applications.

3. The AAN system of claim 1, wherein the first forwarding layer unit is further configured to:
  receive a flow rule from the first control layer unit; and
  update a flow table of the first forwarding layer unit based on the received flow rule.

4. The AAN system of claim 1, wherein the first forwarding layer unit is further configured to:
  receive a data packet from one of the first access layer unit, a second forwarding layer unit in the multiple forwarding layer units, or the first control layer unit;
  determine whether a destination port of the data packet is in a flow table of the first forwarding layer unit;
  in response to a determination that the destination port of the data packet is in the flow table of the first forwarding layer unit,
    send the data packet through the destination port to one of the first access layer unit or another forwarding layer unit in the multiple forwarding layer units; and
  in response to a determination that the destination port of the data packet is not in the flow table of the first forwarding layer unit,
    send a request for a flow rule of the data packet to the first control layer unit.

5. The AAN system of claim 1, wherein the first control layer unit is further configured to:
  receive a request for a flow rule of a data packet from the first forwarding layer unit;
  generate the flow rule of the data packet based on an optimal network route of the data packet; and
  send the flow rule to the first forwarding layer unit.

6. The AAN system of claim 1, wherein the first control layer unit is further configured to:
  determine whether a received data packet is sent from a core network;
  in response to a determination that the received data packet is sent from the core network,
    determine whether to send the received data to the first forwarding layer unit based on whether a destination of the received data packet being in a network topology of the first control layer unit; and
  in response to a determination that the received data packet is not sent from the core network,
    send the received data packet to the core network.

7. The AAN system of claim 6, wherein the first control layer unit is further configured to:
  send the received data packet to the first forwarding layer unit based on the destination of the received data packet being in the network topology of the first control layer unit; and
  discard the received data packet based on the destination of the received data packet not being in the network topology of the first control layer unit.

8. The AAN system of claim 1, wherein the first control layer unit is further configured to:
  monitor local link changes of the managed subset of the multiple forwarding layer units and the managed subset of the multiple access layer units; and
  update a route for transmitting and receiving a data packet within a local domain of the first control layer unit.

9. The AAN system of claim 1, wherein a data transmission between the first access layer unit and a second access layer unit in the multiple access layer units is performed without accessing the ground base station, the second access layer unit being managed by a second control layer unit in the multiple control layer units.

10. A method of providing a network service using an aerial access network (AAN) system that includes multiple control layer units, multiple forwarding layer units, and multiple access layer units, wherein the control layer units comprise airships and the forwarding layer units comprise UAVs, and the airships of the control layer units are at a higher attitude than UAVs of the forwarding layer units; the method comprising:
  performing, by a first control layer unit in the multiple control layer units, first data transmissions between a ground base station and a subset of the multiple forwarding layer units that is managed by the first control layer unit;
  performing, by a first forwarding layer unit in the managed subset of the multiple forwarding layer units, second data transmissions between at least one access layer unit in the multiple layer units that is associated with the first forwarding layer unit and one of the first control layer unit or the ground base station;
  performing, by a first access layer unit in the at least one access layer unit, third data transmissions between the first forwarding layer unit and at least one user equipment (UE) associated with the first access layer unit;
  receiving, by the first access layer unit, a data packet from the first forwarding layer unit;
  determining, by the first access layer unit, whether a destination port of the data packet is in a flow table of the first access layer unit;

in response to a determination that the destination port of the data packet is in the flow table of the first access layer unit,
  sending, by the first access layer unit, the data packet through the destination port to one of the at least one UE; and
in response to a determination that the destination port of the data packet is not in the flow table of the first access layer unit,
  sending, by the first access layer unit, the data packet to the first forwarding layer unit.

11. The method of claim 10, further comprising:
receiving, by the first access layer unit, a connection request from one of the at least one UE; and
registering, by the first access layer unit, the one of the at least one UE with network management applications.

12. The method of claim 10, further comprising:
receiving, by the first forwarding layer unit, a flow rule from the first control layer unit; and
updating, by the first forwarding layer unit, a flow table of the first forwarding layer unit based on the received flow rule.

13. The method of claim 10, further comprising:
receiving, by the first forwarding layer unit, a data packet from one of the first access layer unit, a second forwarding layer unit in the multiple forwarding layer units, or the first control layer unit;
determining, by the first forwarding layer unit, whether a destination port of the data packet is in a flow table of the first forwarding layer unit;
in response to a determination that the destination port of the data packet is in the flow table of the first forwarding layer unit,
  sending, by the first forwarding layer unit, the data packet through the destination port to one of the first access layer unit or another forwarding layer unit in the multiple forwarding layer units; and
in response to a determination that the destination port of the data packet is not in the flow table of the first forwarding layer unit,
  sending, by the first forwarding layer unit, a request for a flow rule of the data packet to the first control layer unit.

14. The method of claim 10, further comprising:
receiving, by the first control layer unit, a request for a flow rule of a data packet from the first forwarding layer unit;
generating, by the first control layer unit, the flow rule of the data packet based on an optimal network route of the data packet; and
sending, by the first control layer unit, the flow rule to the first forwarding layer unit.

15. The method of claim 10, further comprising:
determining, by the first control layer unit, whether a received data packet is sent from a core network;
in response to a determination that the received data packet is sent from the core network,
  determining, by the first control layer unit, whether to send the received data to the first forwarding layer unit based on whether a destination of the received data packet being in a network topology of the first control layer unit; and
in response to a determination that the received data packet is not sent from the core network,
  sending, by the first control layer unit, the received data packet to the core network.

16. The method of claim 15, further comprising:
sending, by the first control layer unit, the received data packet to the first forwarding layer unit based on the destination of the received data packet being in the network topology of the first control layer unit; and
discarding, by the first control layer unit, the received data packet based on the destination of the received data packet not being in the network topology of the first control layer unit.

17. The method of claim 10, further comprising:
monitoring, by the first control layer unit, local link changes of the managed subset of the multiple forwarding layer units and the managed subset of the multiple access layer units; and
updating, by the first control layer unit, a route for transmitting and receiving a data packet within a local domain of the first control layer unit.

18. The method of claim 10, wherein:
a data transmission between the first access layer unit and a second access layer unit in the multiple access layer units is performed without accessing the ground base station; and the second access layer unit is managed by a second control layer unit in the multiple control layer units.

* * * * *